United States Patent [19]

Miyazi et al.

[11] 4,448,370
[45] May 15, 1984

[54] TAPE TRANSPORT MECHANISM

[75] Inventors: Kazumi Miyazi; Akira Osanai, both of Tokyo, Japan

[73] Assignee: Olympus Optical Company Limited, Tokyo, Japan

[21] Appl. No.: 311,612

[22] Filed: Oct. 15, 1981

[30] Foreign Application Priority Data

Oct. 16, 1980 [JP] Japan .......................... 55-147438[U]

[51] Int. Cl.³ .......................... G03B 1/04; G11B 15/32
[52] U.S. Cl. ...................................... 242/201; 74/209
[58] Field of Search .................................. 242/200-204, 242/67.4; 360/74.1, 74.2, 96.3; 40/468, 469, 486, 519; 74/207-209, 384

[56] References Cited

U.S. PATENT DOCUMENTS

| | | | |
|---|---|---|---|
| 2,896,873 | 7/1959 | Mageoch | 242/67.4 |
| 3,133,710 | 5/1964 | Herterich | 242/201 |
| 3,211,014 | 10/1965 | Sanderson | 74/207 |
| 3,495,789 | 2/1970 | Gerfast | 242/201 |
| 3,608,847 | 9/1971 | Hufford | 242/204 |
| 3,672,593 | 6/1972 | Knowles et al. | 242/67.4 |
| 3,923,267 | 12/1975 | Eckerd et al. | 242/67.4 |
| 3,968,942 | 7/1976 | Wrobel et al. | 242/204 |
| 4,034,619 | 7/1977 | Scregni | 74/384 |
| 4,046,334 | 9/1977 | Kato et al. | 242/201 |
| 4,149,202 | 4/1979 | Terada et al. | 360/96.3 |
| 4,185,794 | 1/1980 | Mukaida | 242/201 |
| 4,209,145 | 6/1980 | Erickson | 242/204 |
| 4,330,098 | 5/1982 | Santoro | 242/201 |
| 4,346,859 | 8/1982 | Osanai | 242/201 |

Primary Examiner—Leonard D. Christian
Attorney, Agent, or Firm—Toren, McGeady and Stanger

[57] ABSTRACT

A tape transport mechanism includes a supply reel base and a take-up reel base each having a rotary gear and arranged at a given distance apart, a rotatable lever arranged between the reel bases, a rotating gear rotatably supported by the rotatable lever and having its shaft arranged at a position deviated from a line connecting the centers of both reel bases, the rotating gear being slightly meshed with the rotary gear of each reel base under the condition of positioning the rotatable lever at the center of both reel bases, and a drive source for driving the rotating gear in forward and reverse directions.

3 Claims, 4 Drawing Figures

TAPE TRANSPORT MECHANISM

BACKGROUND OF THE INVENTION

The present invention relates to a tape transport mechanism, more and particularly, to a device for transporting a magnetic tape which is capable of changing the running direction with simple construction.

SUMMARY OF THE INVENTION

It is an object of the present invention to eliminate the disadvantages of the conventional tape transport mechanism.

It is another object of the present invention to provide a tape transport mechanism in which the rotating gear for transmitting rotation or torque of the drive motor is slightly meshed with rotary gears of a pair of reel bases in the stopped condition of the drive motor and is arranged at the position deviated from a line connecting the centers of both reel bases thereby to omit the friction mechanism from the drive mechanism so that change-over of the rotating gear can be surely carried out and the cost can be decreased.

According to the present invention there is provided a tape transport mechanism for use in a tape recorder comprising a supply reel base each and a take-up reel base having a rotary gear and arranged at a given distance apart, a rotatable lever arranged between the reel bases, a rotating gear rotatably supported by the rotatable lever and having its shaft arranged at the position deviated from a line connecting the centers of both reel bases, the rotating gear being slightly meshed with the rotary gear of each reel base under the condition of positioning the rotatable lever at the center of both reel bases, and a drive source for driving the rotating gear in the forward and reverse directions. The rotatable lever in controlled by a control member so as to position the lever at the center of both reel bases under the stopped condition. The control member is a helical spring.

BRIEF DESCRIPTION OF THE DRAWING

These and other features and advantages of the present invention will become readily apparent from the following detailed description of one embodiment of the present invention, particularly when taken in conjunction with the accompanying drawings wherein like reference numerals designate like or functionally equivalent parts, and wherein.

DESCRIPTION OF THE PREFERRED EMBODIMENT

Figure 1:
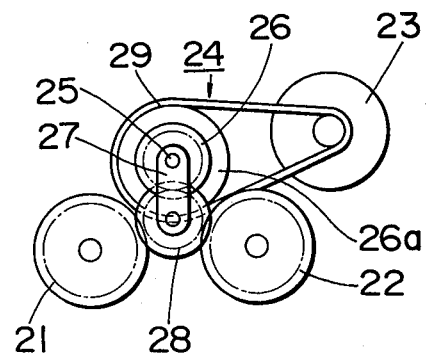
FIG. 1 is a plan view showing a construction of a tape transport mechanism according to the present invention.

Referring now to the drawings, there is shown an embodiment of a tape transport mechanism according to the present invention. In FIG. 1 reference numerals 21 and 22 are a pair of reel bases rotatably arranged at a given distance apart and each having a rotary gear. The reel base shown on the left hand is referred to as a take-up reel base 21 and the reel base shown on the right hand is referred to as a supply reel base 22. Reference numeral 23 is a drive source, for example a drive motor which rotates in the clockwise direction under fast forward operation and in the counterclockwise direction under rewind operation. Reference numeral 24 is a fast forward and rewind change-over mechanism arranged between these reel bases 21 and 22. The mechanism 24 serves to transmit a torque of the drive motor 23 to rotary gears of the take-up reel base 21 and the supply reel base 22 according to the fast forward operation and the rewind operation. The change-over mechanism 24 is so constructed that a rotating drive gear 26 having a pulley 26a which is an integral part of the drive 26 is mounted to a fixed shaft 25, a rotating lever 27 is mounted to the drive gear 26, and a rotating gear 28 is rotatably supported by the rotatable lever 27 under the state of meshing the drive gear 26 therewith. In this case the center of the rotating gear 28 is slightly deviated from a line connecting the center of both reel bases 21 and 22 and the rotating gear 28 is slightly meshed with rotary gears of both reel bases 21 and 22 with the rotatable lever 27 centered between both reel bases 21 and 22 when the drive motor 23 is stopped as shown in FIG. 1. Reference numeral 29 is a belt stretched between the pulley 26a of the drive gear 26 and a pulley secured to a rotating shaft of the drive motor 23 by force fit. The mechanism 24 also comprises a control member for forcibly positioning the rotatable lever 27 at the center of both reel bases 21 and 22. The control member 30 is formed by, for example, a helical spring, note FIG. 4.

Figure 2:
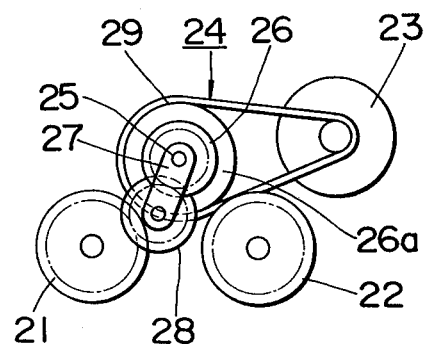
FIG. 2 is a plan view explaining operation of the transport mechanism shown in FIG. 1.

The operation of the tape transport mechanism according to the present invention is now explained. When the tape transport mechanism is under fast forward operation the drive motor 23 rotates in the clockwise direction thereby to rotate the drive gear 26 through the belt 29. The tape transport mechanism adopts a belt transmission mechanism so that the drive gear 26 is rotated in the same directions as the rotating direction of the drive motor 23. The torque of the drive motor 23 is transmitted to the rotating gear 28 through the drive gear 26. Then the rotating gear 28, slightly meshed with rotary gears of both reel bases 21 and 22, is displaced so that the rotating gear 28 is completely meshed with the rotary gear of the take-up reel base 21 by rotation of the gear 28 as shown in FIG. 2. In this case the rotatable lever 27 is drawn up to the take-up reel base 21 so that the rotating gear 28 is completely separated from the rotary gear of the supply reel base 22 thereby to transmit the torque of the drive motor 23 to the rotary gear of the take-up reel base 21 through the belt 29, the drive gear 26 and the rotating gear 28.

Figure 3:
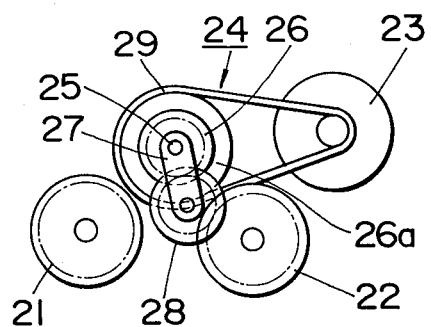
FIG. 3 is a plan view, similar to FIG. 1, however, illustrating the rewind mode of the tape transport mechanism.

When the tape transport mechanism is under the rewind operation the drive motor 23 rotates in the counterclockwise direction thereby to rotate the drive gear 26 in the same direction as the above rotating direction of the drive motor 23 through the belt 29. In this case, since the rotating gear 28 is slightly meshed with rotary gear of both reel bases 21 and 22 in the same manner as described above, when the rotating gear 28 rotates in the counterclockwise direction the gear 28 is completely meshed with the rotary gear of the supply reel base 22 thereby to draw up the rotatable lever 27 to the supply reel base 22 and to completely separate the rotating gear 28 from the rotary gear of the take-up reel base 21 so that the torque of the drive motor 23 is transmitted to the rotary gear of the supply reel base 22 through the belt 29, the drive gear 26 and the rotating gear 28, note FIG. 3.

Figure 4:
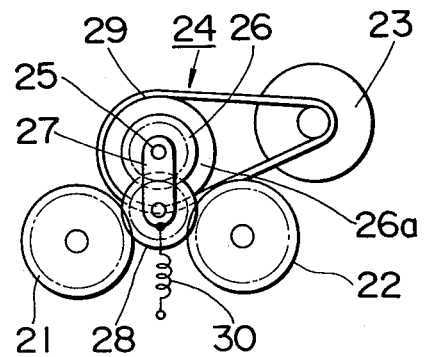
FIG. 4 is a plan view, similar to FIG. 1, but displaying a second embodiment of the present invention.

When the drive motor 23 is stopped the rotatable lever 27 is positioned at the center between both reel bases 21 and 22 by the control member 30, note FIG. 4, so that the rotating gear 28 is slightly meshed with the gears of the reel bases 21 and 22 and is in the standby condition.

According to such construction the friction mechanism, necessary in the conventional tape transport mechanism, can be omitted so that the cost thereof can be decreased and the change-over of the rotating gear 28 can be surely carried out.

It is further understood by those skilled in the art that the foregoing description is a preferred embodiment of the disclosed mechanism and the present invention is not limited thereto and that various changes and modifications may be made in the present invention without departing from the spirit and scope thereof.

In the above embodiment the rotatable lever is forcibly positioned at the center between both reel bases by the control member, note FIG. 4, but the present invention is not limited thereto and this control member may be omitted, since the rotating gear is always meshed with one of rotary gears of both reel bases according to its rotating direction thereof.

As described above, the present invention can provide a tape transport mechanism in which the rotating gear for transmitting rotation or torque of the drive motor is slightly meshed with the rotary gears of a pair of reel bases in the stopped condition of the drive motor and is arranged at the position deviated from a line connecting the centers of both reel bases for omitting the friction mechanism, from the drive mechanism so that change-over of the rotating gear can be surely carried out and the cost can be decreased.

What is claimed is:

1. A tape transport mechanism for use in a tape recorder comprising a supply reel base and a take-up reel base each having a rotary gear and arrangd at a given distance apart, a rotatable lever arranged between the reel bases, a rotating gear rotatably supported by the rotatable lever and said rotating gear having a shaft arranged at a position deviated from a line connecting the centers of both reel bases, in the stopped condition of said mechanism the rotating gear is slightly meshed with the rotary gear of each reel base with the rotatable lever centered between said reel bases, and a drive source for driving the rotating gear in the forward and reverse directions.

2. A tape transport mechanism as claimed in claim 1, including a control member for positioning the rotatable lever centered between both reel bases in the stopped condition of the rotating gear.

3. A tape transport mechanism as claimed in claim 2, wherein the control member is a helical spring.

* * * * *